COMBINED MEMORY STORAGE AND SWITCHING ARRANGEMENTS

Filed July 2, 1959 2 Sheets-Sheet 1

INVENTOR
W. P. MASON
BY H. O. Wright
ATTORNEY

Jan. 2, 1962 W. P. MASON 3,015,708

COMBINED MEMORY STORAGE AND SWITCHING ARRANGEMENTS

Filed July 2, 1959 2 Sheets-Sheet 2

INVENTOR
W. P. MASON
BY H. O. Wright
ATTORNEY

United States Patent Office 3,015,708
Patented Jan. 2, 1962

3,015,708

COMBINED MEMORY STORAGE AND SWITCHING ARRANGEMENTS

Warren P. Mason, West Orange, N.J., assignor to Bell Telephone Laboratories, Incorporated, New York, N.Y., a corporation of New York Filed July 2, 1959, Ser. No. 824,548
9 Claims. (Cl. 200—87)

This invention relates to combined memory storage and switching arrangements.

A principal object of the invention is to combine memory storage facilities with switching facilities capable of instantaneously responding to very short electrical control pulses.

A further object is to combine memory storage facilities with switching facilities capable of performing switching operations in wholly metallic circuits.

Instantaneously responsive memory storage facilities of the prior art which simultaneously perform switching functions have commonly been of the thermionic vacuum tube type or of the semiconductive element type in which circuits are established through electronic paths.

For a number of important purposes such as switching in circuits intended to carry telephonic messages, it is preferable that wholly metallic circuits be established by the switching facilities of the system.

This is accomplished in accordance with the present invention by the provision of metallic contacts associated with memory storage elements, which elements in the acts of storing and releasing an information bit undergo sufficient physical motion to close and open the contacts, respectively. The storage elements can be of electromagnetic, magnetostrictive or of electrostrictive material, as will presently become apparent. By "instantaneous response," completion of a specific function within a few microseconds or less is contemplated.

Since, in general, memory storage elements are usually employed in groups containing a large number of individual units, it is frequently desirable in order to avoid bulky assemblies that individual devices of the invention be of relatively small size. This in turn makes it virtually mandatory in many situations that the specific magnetostrictive or electrostrictive devices employed should use elements operated in the torsional mode since larger physical displacements are obtainable by this mode. It will be apparent to those skilled in the art, however, that elements responding in the longitudinal or flexural or other modes can also at times be employed in devices of the invention, particularly where space requirements do not severely limit the size of element which can be used.

The above and other features, objects and advantages of the invention will become apparent from a perusal of the following detailed description of specific embodiments of the principles of the invention as illustrated in the attached drawings, in which.

Figure 1:
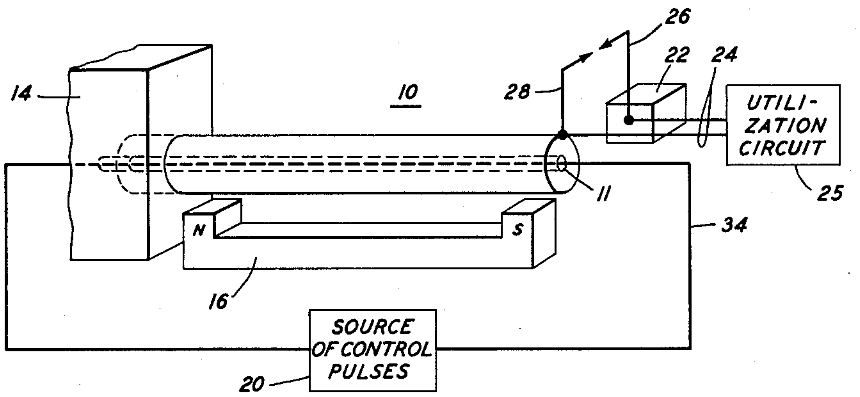
FIG. 1 is illustrative of the use of a magnetostrictive element in a first specific structure of the invention.

In more detail in FIG. 1, cylinder 10 is of magnetostrictive material, a preferred material being, for example, nickel cobalt ferrite. Many other ferrites and metals such as nickel, zinc, iron, cobalt and alloys including two or more metals are well known to those skilled in the art as being endowed with sufficiently strong magnetostrictive properties to be of use in devices of the invention. See Table VI, in applicant's book entitled "Physical Acoustics and the Properties of Solids," pages 81 and 82. This book was published in 1958 by D. Van Nostrand Co., Inc., New York.

One end (at the left in FIG. 1) of cylinder 10 is firmly held in the rigid support member 14. Cylinder 10 has a concentric tubular opening 11 from end to end through it to accommodate a conductor 34, as shown. Adjacent cylinder 10 a permanent magnet 16 is positioned to magnetize cylinder 10 in a direction parallel to its longitudinal axis. At the free end of cylinder 10 (on the right end as shown in FIG. 1) a contacting arm 28 is firmly attached to cylinder 10 and is held in close proximity to a similar contacting arm 26 supported on a fixed member 22, as shown. Conductive leads 24 connect to contacting arms 26, 28, and to a utilization circuit 25, as shown. A source of control pulses 20 is connected to conductor 34 so that when a pulse of a predetermined polarity is sent by source 20 through conductor 34 cylinder 10 will be subjected to a torsional force which will twist it sufficiently to bring contact arm 28 into physical contact with contact arm 26. This closes a metallic circuit through leads 24 to utilization circuit 25 which can for example complete or close a circuit between two telephones, or the like. Because of hysteresis when operated as described above, the remanent polarization of element 10 will hold contacting arm 28 in contact with arm 26 until a releasing pulse of opposite polarity to the actuating pulse is sent through conductor 34 by control pulse source 20. As magnetostrictive devices respond instantaneously, the arrangement of FIG. 1 obviously constitutes an instantaneously operating combined memory storage and switching device.

Figure 2:
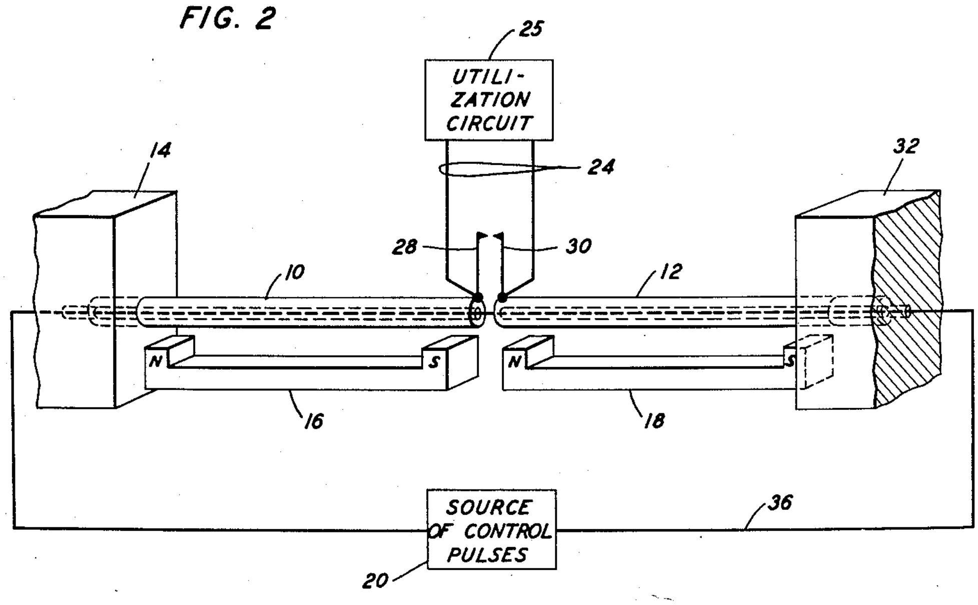
FIG. 2 is illustrative of the use of a pair of magnetostrictive elements in a second specific structure of the invention.

In FIG. 2 an arrangement similar to that of FIG. 1 is shown. Like portions of the two arrangements of FIGS. 1 and 2 bear identical designation numbers, respectively, and can be as described above for FIG. 1. The arrangement of FIG. 2 differs primarily from that of FIG. 1 in that a second cylinder 12 of magnetostrictive material with a polarizing permanent magnet 18 is provided. Cylinder 12 can be identical with cylinder 10 and magnet 18 can be identical with magnet 16, respectively. Cylinder 12 is supported along a common longitudinal axis with cylinder 10 by a second rigid fixed support 32 holding its right end. The left end of cylinder 12 is in close proximity to the right end of cylinder 10, as shown. On the left end of the second cylinder 12 a contacting arm 30 is rigidly supported at a short distance from arm 28. A conductor 36 which passes through the axial openings of both cylinders, as shown, is connected to source of control pulses 20, as shown. A control pulse of proper polarity from source 20 will cause the adjacent ends of cylinders 10 and 12 to twist in the appropriate directions to bring contacting arms 28 and 32 together thus closing a metallic circuit through leads 24 to utilization circuit 25, as for FIG. 1. Also, as for FIG. 1, because of remanent polarization of the elements 10 and 12, when closed by an energy pulse, the contacting arms 28 and 30 will remain closed until a control pulse of opposite polarity is sent through conductor 36 from source 20. Obviously the arrangement of FIG. 2 is of essentially the same character as that of FIG. 1 but can afford twice the contact motion.

Figure 3:
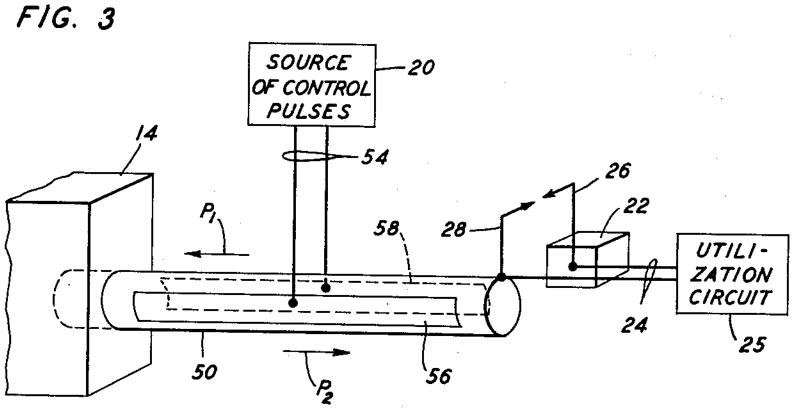
FIG. 3 is illustrative of the use of an electrostrictive element in a third specific structure of the invention.
Figure 4:
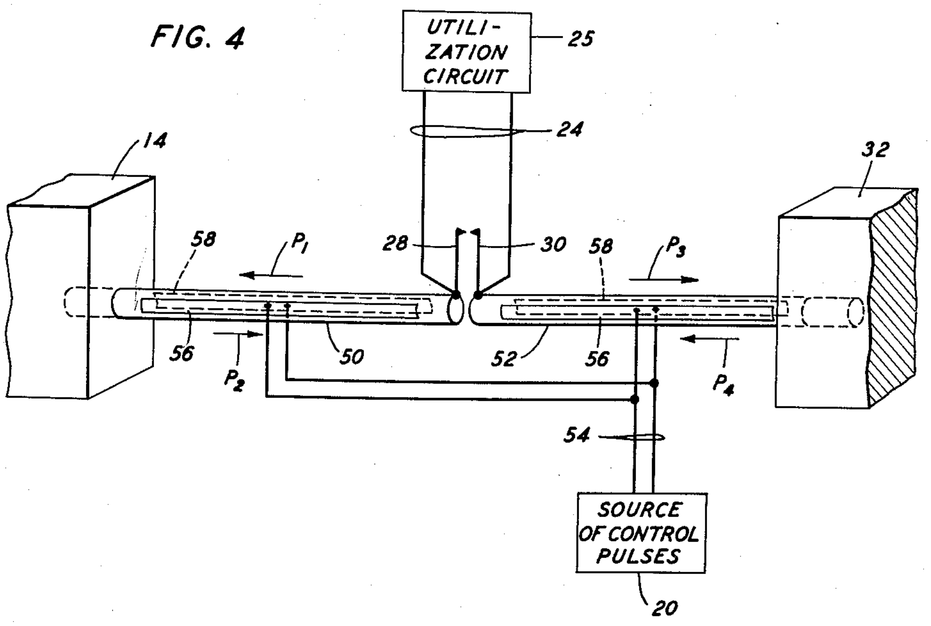
FIG. 4 is illustrative of the use of a pair of electrostrictive elements in a fourth specific structure of the invention.

In FIGS. 3 and 4 the electrostrictive counterparts of the magnetostrictive elements of FIGS. 1 and 2, respectively, are illustrated.

In FIG. 3 electrostrictive element 50 which, for example, may be of barium titanate, or a mixture of titanates, as described in my copending application, Serial No. 351,843, filed April 29, 1953, now Patent 2,906,973, granted September 29, 1959, is longitudinally polarized as taught in FIG. 1 of my Patent 2,742,614 granted April 17, 1956 for a Torsional Transducer, so that the upper and lower halves of unit 50 about a horizontal plane including its longitudinal axis are of opposite polarity as indicated for example by the arrows $P_1$ and $P_2$ in FIG. 3. The polarizing electrodes are removed and front electrode 56 and rear electrode 58 are then placed on cylinder 50 and connected by leads 54 to source of control pulses 20. Other elements of the arrangement are identical with the correspondingly designated elements of FIG. 1 and the operation of the arrangement of FIG. 3 is substantially identical to that of FIG. 1 except of course it is the remanent polarization of element 50 resulting from a short control pulse of appropriate polarity from source 20 which holds arms 26 and 28 in contact until a control pulse of opposite polarity is provided by source 20.

Similarly, the arrangement of FIG. 4 is the electrostrictive counterpart of that of FIG. 2. The arrangement of FIG. 4 is likewise similar to the arrangement of FIG. 3 except that a second electrostrictive member 52 having polarizations $P_3$ and $P_4$, and which can be identical to member 50, is employed to hold the contacting arm 30 in close proximity to arm 28. Again, a control pulse of proper polarity from source 20 through leads 54 will cause cylinders 50 and 52 to twist so as to bring contact arms 28 and 30 into physical contact and will hold them in contact because of remanent polarization until a control pulse of opposite polarity is supplied by source 20.

Thus the arrangements of FIGS. 1 through 4, inclusive, are all instantaneously-operating memory storage and switching devices capable of closing wholly metallic circuits and possessing the characteristic now frequently called "a memory" in that they retain a setting corresponding to the polarity of the last control pulse applied to them. Devices having the property of memory storage are, of course, of substantial value for use in computing circuit arrangements and the like. For many purposes, as previously mentioned, it is highly desirable also that the devcie when "closed" should provide a wholly metallic circuit. The arrangements of FIGS. 1 through 4, inclusive, all obviously also provide this feature.

Numerous and varied other arrangements and modifications of the specific arrangements given by way of illustration hereinabove will readily occur to those skilled in the art within the spirit and scope of the invention. No attempt has here been made to exhaustively cover all such arrangements and modifications.

What is claimed is:

1. The combination comprising an elongated cylindrical element of a material susceptible to polarization and having substantial remanent polarization, the element being polarized longitudinally, means rigidly supporting the element at one end, a first electrical contacting means rigidly attached to the other end of the element, a second electrical contacting means supported independently of the element and in close proximity to the first contacting means, a utilization circuit connected to the first and second contacting means, means responsive to a momentary unidirectional signal pulse to impress a transverse field on the element and a source of momentary unidirectional signal pulses of reversible polarity electrically connected to the last-mentioned means, whereby distortion of the element resulting from application of the transverse field causes the first electrical contacting means to move toward the second for one polarity of signal pulse or to move away from the second for the other polarity of signal pulse, remanent polarization of the element maintaining its response position to the last received signal pulse until the next pulse of opposite polarity is received, the combination thereby serving both as a switching device adapted to close and open a wholly metallic circuit and a memory device in which is registered a record of the polarity of the last signal pulse received.

2. The combination of claim 1 in which the element is of magnetostrictive material having a longitudinal coaxial opening through it and the means for impressing a transverse field on the element comprises a conductor threaded through the opening and electrically connected to the signal pulse source.

3. The combination of claim 1 in which the element is of electrostrictive material and the means for impressing a transverse field on the element comprises a pair of electrodes disposed on opposite sides of the element and conductors electrically connecting the electrodes to the signal pulse source.

4. The combination comprising a pair of elongated cylindrical elements of a material susceptible to polarization and having substantial remanent polarization, the cylindrical elements being longitudinally polarized and being aligned along a common longitudinal axis with adjacent ends separated by a small interval, the more remote ends of the two elements being firmly held by rigid supporting means, respectively, first and second electrical contacting means rigidly attached to the adjacent ends, respectively, of the two elements and held in close proximity to each other, a utilization circuit connected to the contacting means, means responsive to a momentary unidirectional signal pulse to impress transverse fields upon both elements, and a source of momentary unidirectional signal pulses of reversible polarity electrically connected to the last-mentioned means, whereby distortion of the elements resulting from application of the transverse field causes the contacting means to come together for one polarity of signal pulse and to move apart for the other polarity of signal pulse, remanent polarization of the elements maintaining their respective response positions to the last received signal pulse until the next pulse of opposite polarity is received, the combination thereby serving both as a switching device adapted to close and open a wholly metallic circuit and a memory device in which is registered an indication of the polarity of the last signal pulse received.

5. The combination of claim 4 in which the elements are of magnetostrictive material having longitudinal coaxial openings through them and the means for impressing the transverse fields on the two elements comprises a conductor threaded through the longitudinal coaxial openings in the elements and electrically connected to the signal pulse source.

6. The combination of claim 4 in which the elements are of electrostrictive material and the means for impressing the transverse fields on the two elements comprise a pair of electrodes on each element disposed on opposite sides of the element and conductors electrically interconnecting the electrodes and the signal pulse source.

7. In combination, a member of polarizable material having a large remanent polarization, the member being polarized parallel to a predetermined axis of the member, a pair of switching contacts, a first one of the contacts being attached to the member, the other being supported in close proximity to the first, and means of reversible polarity for momentarily impressing a unidirectional field transversally to the predetermined axis whereby physical deformation of the member will move the pair of switching contacts together upon the application of a transverse field of one polarity and move the contacts apart upon the application of a transverse field of the other polarity, the remanent polarization of the member holding the contacts in the position of response to a momentary transverse field of one polarity until a transverse field of the opposite polarity is impressed upon it.

8. The combination of claim 7 in which the member is of magnetostrictive material.

9. The combination of claim 7 in which the member is of electrostrictive material.

References Cited in the file of this patent

UNITED STATES PATENTS

| | | |
|---|---|---|
| 2,227,268 | Mason | Dec. 31, 1940 |
| 2,714,642 | Kinsley | Aug. 2, 1955 |
| 2,883,486 | Mason | Apr. 21, 1959 |
| 2,896,044 | McCreary | July 21, 1959 |